(12) United States Patent
Willden (10) Patent No.: US 10,078,228 B2
(45) Date of Patent: Sep. 18, 2018

(54) THREE-DIMENSIONAL IMAGING SYSTEM (71) Applicant: Jeremy Paul Willden, Pleasant Grove, UT (US)

(72) Inventor: Jeremy Paul Willden, Pleasant Grove, UT (US)

( * ) Notice: Subject to any disclaimer, the term of this patent is extended or adjusted under 35 U.S.C. 154(b) by 0 days.

(21) Appl. No.: 15/721,634

(22) Filed: Sep. 29, 2017

(65) Prior Publication Data

US 2018/0088346 A1    Mar. 29, 2018

Related U.S. Application Data (60) Provisional application No. 62/401,456, filed on Sep. 29, 2016.

(51) Int. Cl.
*G03B 21/14* (2006.01)
*H04N 13/00* (2018.01)
*G02B 27/22* (2018.01)
*G03B 35/26* (2006.01)
*G03B 21/625* (2014.01)

(52) U.S. Cl.
CPC ....... *G02B 27/2235* (2013.01); *G02B 27/225* (2013.01); *G02B 27/2228* (2013.01); *G03B 21/625* (2013.01); *G03B 35/26* (2013.01)

(58) Field of Classification Search
CPC .......... G03B 21/14; G03B 35/22; H04N 9/31; H04N 13/00; H04N 13/30; H04N 13/302; G02B 27/22; G02B 27/2214; G02B 27/2235; G02B 27/225; G02B 27/24; G02B 27/285; G02B 27/2228; G01S 7/52068
See application file for complete search history.

(56) References Cited

U.S. PATENT DOCUMENTS

| | | | |
|---|---|---|---|
| 6,714,349 B2 * | 3/2004 | Nam | G03B 21/602 359/457 |
| 7,417,664 B2 | 8/2008 | Tomita | |
| 8,240,854 B2 * | 8/2012 | Krijn | G02B 27/2214 353/8 |
| 8,472,786 B2 | 6/2013 | Kusuda | |
| 8,746,894 B2 * | 6/2014 | Atkins | G02B 27/2214 353/77 |
| 8,849,012 B2 | 9/2014 | Tamaru | |
| 9,019,261 B2 | 4/2015 | Ohta | |
| 9,066,076 B2 | 6/2015 | Nakane | |
| 9,210,396 B2 | 12/2015 | Noguchi | |
| 2010/0259818 A1 * | 10/2010 | Mikoshiba | G03B 21/56 359/459 |

* cited by examiner

*Primary Examiner* — William C Dowling
(74) *Attorney, Agent, or Firm* — Angus C. Fox, III (57) ABSTRACT A three-dimensional imaging system relies on effective native image resolution reduction in order to provide an array of pixel clusters, or voxels, with each pixel of the voxel representing a pixel of the image from a unique viewing angle. A 16-megapixel screen having 16-pixel voxels results in a screen having an image capacity downgraded to a 1-megapixel screen capable of showing sixteen different viewing angles. The system can be set up as a rear-projection screen or as a reflective screen illuminated by a front projector. The invention is best implemented with projectors and screens that represent all colors at a single physical location, such as a 3-panel LCD color-combinant projector or a DLP projector, either single or triple chip type. When the RGB sub-pixels are non-coincident, the viewers will see color artifacts that detract from the viewing experience.

20 Claims, 8 Drawing Sheets

THREE-DIMENSIONAL IMAGING SYSTEM

RELATED APPLICATIONS

This application claims a priority date of Sep. 29, 2016, based on the filing of the identically-titled provisional patent application No. 62/401,456.

FIELD OF THE INVENTION

The present invention relates to projection screens and, m ore particularly, to projection screens capable of displaying three-dimensional images.

BACKGROUND OF THE INVENTION

This focus of this invention is the simulation of three-dimensional images on a display screen. Traditional three-dimensional simulation requires each viewer to wear glasses that separate left and right eye images. There are at least two drawbacks to this traditional approach. The first is that the glasses reduce the image brightness. The second is that the glasses approach discriminates against persons having monocular vision. Whereas those having monocular vision can obtain a three-dimensional perspective of the world around them by movement within their environment, simulation of three-dimensional images using glasses fails to provide such an effect. Third, the glasses are uncomfortable for many. Fourth, the need for image splitting glasses makes certain desirable three-dimensional displays, such as billboards, or a scene in a theme park queue or ride, impractical. Fifth, the need for glasses to create a three-dimensional image would be unusable in a composite image where, for example, a three-dimensional image is used as a backdrop in a stage play with live actors.

The resolution of display screens has continued to increase over time. However, the ability of the human eye to discern the pixels (at a given distance) has not kept pace with the improved technology. In fact, it remains unchanged. Beyond a specific viewing distance, humans cannot discern the difference between a 2K and a 4K resolution screen. Given that display resolutions are likely to continue to increase with time, the present invention proposes that a portion of the enhanced resolution can be sacrificed in order to provide three-dimensional viewing of an image without the use of glasses to separate left and right images.

Lenticular Printing and Three-Dimensional Simulation

An illusion of depth, the ability to simulate movement within an image, or a complete change in image can be provided by lenticular printing, a technology that dates from the early 1940s. This technology employs a unified array of adjoining parallel cylindrical lenses, or lenticules, known as a lenticular lens. The illusion of depth, simulated movement or a change in images occurs as the lenticular print is viewed from different angles. Though originally used primarily for the manufacture of novelty items, such as the "wiggle picture" prizes found in Cracker Jack® snack boxes that feature flip and other animation effects such as winking eyes, technological advances in recent years in the design of large-format presses have allowed for the use of oversized lenticular lenses which provide greater ranges of perceived motion and depth. Thus, lenticular prints are now being used extensively for advertising graphics that change their message as the viewing angle changes and for marketing tools, which show products in motion or operation. The use of lenticular images has seen a recent surge in popularity, and they are now found on magazine covers, on trading cards, as well as on sports posters and on signs in stores that intended to attract the attention of customers.

Lenticular printing is a multi-step process whereby an interlaced image of at least two pictures or photographs is combined with a lenticular lens. Using the latest precision manufacturing techniques, thirty or more images can be combined. This process can be used to create various frames of animation (for a motion effect), to provide multiple layers having different incremental offsets (for a 3D effect) or, simply, to show a set of alternate images which may appear to transform, or morph, into each other. Once the various images are collected, each image is compressed either horizontally or vertically (depending on the planned orientation of the lens lenticules) into individual frame files, and then combined into a single final file using a process called interlacing. For modern lenticular processing, file compression and interlacing are performed using a digital computer. The process is then completed by printing the interlaced image directly on the smooth, backside of the unified lens array. Alternatively, the interlaced image can be printed on a substrate (ideally a synthetic paper), which is then laminated to a lenticular panel, or lens. When printing to the backside of the lens, the critical registration of the fine "slices" of interlaced images must be absolutely correct during the lithographic or screen printing process, otherwise "ghosting" and poor imagery will result. Ghosting is defined as the failure of one of the interlaced images to completely disappear after the viewing angle has been changed in order to view the second image. Although lens quality and lighting conditions are the two most important factors in minimizing ghosting, ghosting can also occur when demand for an effect exceeds the limits and technical capabilities of the lenticular system. Nevertheless, the perception of ghosting can be minimized if the interlaced images are precisely registered so that similar details on one image are superimposed over those of the other(s). If the interlaced images are properly registered (i.e., aligned) with the lens spacing, the combined lenticular print will show two or more different images simply by changing the angle from which the print is viewed. If thirty or more images taken in a sequence are used, one can even show a short video of about one second. Though normally produced in sheet form, by interlacing simple images or different colors throughout the artwork, lenticular images can also be created in roll form with 3D effects or multi-color changes. Alternatively, one can use several images of the same object, taken from slightly different angles, and then create a lenticular print which shows a stereoscopic 3D effect. 3D effects can only be achieved in a side to side (left to right) direction, as the viewer's left eye needs to be seeing from a slightly different angle than the right to achieve the stereoscopic effect. Other effects, like morphs, motion, and zooms work somewhat better (less ghosting or latent effects) as top-to-bottom effects due to both eyes of the viewer having the same viewing angle, but can be achieved in both directions. There are several film processors that will take two or more pictures and create lenticular prints for hobbyists, at a reasonable cost. Affordable equipment and software is even available for making lenticular prints at home or in the office. This is in addition to the many corporate services that provide high volume lenticular printing.

There are many commercial end uses for lenticular images, which can be made from PVC, APET, acrylic, and PETG, as well as other materials. While PETG and APET are the most common, other materials are becoming popular in order to accommodate outdoor use and special forming due to the increasing use of lenticular images on cups and gift cards. Lithographic printing of lenticular images involves the deposition of ink directly onto the flat side of the lenticular lens. For the creation of high-resolution photographic lenticulars, the interlaced image is typically laminated to the lens. Large format (over 2 m) lenticular images have recently been used in bus shelters and movie theaters. These images are printed using an oversized lithographic press. Many advances have been made to the extrusion of lenticular lens and the way it is printed which has led to a decrease in cost and an increase in quality.

The newest lenticular technology is manufacturing lenticular images using flexo, inkjet and screen-printing techniques. The lens material comes in a roll or sheet which is fed through flexo or offset printing systems at high speed, or printed with UV inkjet machines (usually flat-beds that enable a precise registration). This technology allows high volume 3D lenticular production at low cost. Because, at the beginning of the story, this new technique only allowed to create non contiguous lenses, the only effect available was the 3D effect with a repeating pattern (moiré). In 2010, a European R&D team (Popims) found a method for printing contiguous lenses and is licensing this technology to printing companies. Specific inks are already produced under license of their patents by a major inks and varnishes manufacturer.

On Feb. 26, 2011, the Nintendo 3DS was first released in Japan. The following month, it was released for sale worldwide. The Nintendo 3DS (usually abbreviated to, simply, 3DS) is a portable game console that is capable of displaying stereoscopic 3D effects without the use of 3D glasses or additional accessories. The 3DS contains two separate screens. A top screen is a 5:3 autostereoscopic LCD screen with a display resolution of 800×240 pixels (400×240 pixels per eye, WQVGA). On the original 3DS console, the screen measures at 3.53 in (90 mm), while on the 3DS XL it measures at 4.88 in (124 mm). The screen is able to produce a three-dimensional effect without the need of 3D-enabling glasses using a parallax barrier. In order to adjust the effect's intensity, there is a 3D Depth Slider next to the screen, which enables the user to adjust the intensity of the 3D effect, or turn it off altogether. A bottom screen is a 4:3 resistive touchscreen with a display resolution of 320×240 pixels (QVGA). On the original 3DS console, the screen measures 77 mm (3.02 in) diagonal, while on the 3DS XL it measures at 106 mm (4.18 in).

It appears that the screen display of the Nintendo 3DS game console was, at least, loosely based on the design of U.S. Pat. No. 7,417,664 to former Sony employee, Seijiro Tomita, as Nintendo was required by the judgment of a lawsuit, brought against it by Tomita, to pay a royalty of 1.82% of the wholesale price of each unit sold to Tomita.

Three Dimensional Images Created with Holography

Holography is the science and practice of making holograms. The term holography comes from the Greek words holos ("whole") and graphe ("writing" or "drawing"). A hologram is a photographic recording of a light field, rather than of an image formed by a lens, and it is used to display a fully three-dimensional image of a holographed subject, which is seen without the aid of special glasses or other intermediate optics. The hologram itself is not an image and it is usually unintelligible when viewed under diffuse ambient light. It is an encoding of the light field as an interference pattern of seemingly random variations in the opacity, density, or surface profile of the photographic medium. When suitably lit, the interference pattern diffracts the light into a reproduction of the original light field and the objects that were in it appear to still be there, exhibiting visual depth cues such as parallax and perspective that change realistically with any change in the relative position of the observer.

Holography can be thought of as somewhat similar to sound recording, whereby a sound field created by vibrating matter like musical instruments or vocal cords, is encoded in such a way that it can be reproduced later, without the presence of the original vibrating matter.

In its pure form, holography requires the use of laser light for illuminating the subject and for viewing the finished hologram. In a side-by-side comparison under optimal conditions, a holographic image is visually indistinguishable from the actual subject, if the hologram and the subject are lit just as they were at the time of recording. A microscopic level of detail throughout the recorded volume of space can be reproduced. In common practice, however, major image quality compromises are made to eliminate the need for laser illumination when viewing the hologram, and sometimes, to the extent possible, also when making it. Holographic portraiture often resorts to a non-holographic intermediate imaging procedure, to avoid the hazardous high-powered pulsed lasers otherwise needed to optically "freeze" living subjects as perfectly as the extremely motion-intolerant holographic recording process requires. Holograms can now also be entirely computer-generated and show objects or scenes that never existed.

Holography should not be confused with lenticular and other earlier autostereoscopic 3D display technologies, which can produce superficially similar results but are based on conventional lens imaging. Stage illusions such as Pepper's Ghost and other unusual, baffling, or seemingly magical images are also often incorrectly called holograms.

Holography can be better understood by comparing it with ordinary photography:

- A hologram represents a recording of information with respect to light that was reflected, or scattered, in a range of directions, rather than from only one direction, as in a photograph. This allows the scene to be viewed from a range of different angles, as if it were still present.
- Although a photograph can be recorded using normal light sources, such as sunlight or electric lighting, a hologram must be recorded with a laser.
- A lens is required to record a photographic image, whereas in holography, the light from the object is scattered directly onto the recording medium.
- A holographic recording requires a second light beam (the reference beam) to be directed onto the recording medium.
- A photograph can be viewed in a wide range of lighting conditions, whereas holograms can only be viewed with very specific forms of illumination.
- When a photograph is cut in half, each piece shows half of the scene. When a hologram is cut in half, the whole scene can still be seen in each piece. This is because, whereas each point in a photograph only represents light scattered from a single point in the scene, each point on a holographic recording includes information about light scattered from every point in the scene. It can be thought of as viewing a street outside a house through a 120 cm×120 cm window, then through a 60 cm×60 cm window. One can see all of the same things through the smaller window (by moving the head to change the viewing angle), but the viewer can see more at once through the 120 cm window.
- A photograph is a two-dimensional representation that can only reproduce a rudimentary three-dimensional effect, whereas the reproduced viewing range of a hologram adds many more depth perception cues that were present in the original scene. These cues are recognized by the human brain and translated into the same perception of a three-dimensional image as when the original scene might have been viewed.

A photograph clearly maps out the light field of the original scene. The developed hologram's surface consists of a very fine, seemingly random pattern, which appears to bear no relationship to the scene it recorded.

The Hungarian-British physicist Dennis Gabor was awarded the Nobel Prize in Physics in 1971 "for his invention and development of the holographic method". His work, done in the late 1940s, was built on pioneering work in the field of X-ray microscopy by other scientists, including Mieczyslaw Wolfke in 1920 and William Lawrence Bragg in 1939. The discovery was an unexpected result of research into improving electron microscopes at the British Thomson-Houston (BTH) Company in Rugby, England, and the company filed a patent in December 1947 (patent GB685286). The technique as originally invented is still used in electron microscopy, where it is known as electron holography, but optical holography did not really advance until the development of the laser in 1960.

A hologram can be made by shining part of a laser light beam directly into the recording medium, and the other part onto the object in such a way that some of the scattered light falls onto the recording medium. A more flexible arrangement for recording a hologram requires the laser beam to be aimed through a series of elements that change it in different ways. The first element is a beam splitter that divides the beam into two identical beams, each aimed in different directions. One beam (known as the illumination or object beam) is spread using lenses and directed onto the scene using mirrors. Some of the light scattered (reflected) from the scene then falls onto the recording medium. The second beam (known as the reference beam) is also spread through the use of lenses, but is directed so that it doesn't come in contact with the scene, and instead travels directly onto the recording medium.

Several different materials can be used as the recording medium. One of the most common is a film very similar to photographic film (silver halide photographic emulsion), but with a much higher concentration of light-reactive grains, making it capable of the much higher resolution that holograms require. A layer of this recording medium (e.g., silver halide) is attached to a transparent substrate, which is commonly glass, but may also be plastic.

SUMMARY OF THE INVENTION

The present invention is a three-dimensional imaging system that provides a novel way of simulating three-dimensional images on a display screen without the need for a viewer to wear image-splitting glasses. It incorporates elements of both lenticular printing and holography. However, it might be best characterized as a super set of lenticular printing, as lasers are not involved. Given that the manufacturing methods for monitors, projectors, DLP® imaging systems, and other displays are likely to continue to produce improved resolutions with time, it will become practical to use lensing systems to reflect or refract small collections of pixels at various angles to produce three-dimensional screens and display systems.

By reducing the effective native image resolution of a display screen or of an image projector, the three-dimensional imaging system creates an array of multi-pixel clusters, or voxels, with each pixel of a single voxel representing a pixel of the image from a unique viewing angle. For example, a 16-megapixel screen having 16-pixel voxels results in a screen having an image capacity downgraded to a 1-megapixel screen that is capable of showing sixteen different viewing angles. Thus, to the extent that the native resolutions are unnecessarily high for human viewing, spatial (angular) resolution can be improved or "traded off against" effective image resolution. The system can be set up as a rear-projection screen or as a reflective screen illuminated by a front projector. The invention is best implemented with projectors and screens that represent all colors at a single physical location, such as a 3-panel LCD color-combinant projector or a DLP projector of either the single-chip or triple-chip type. That is because non-coincident red, green and blue sub-pixels result in color-banded moiré patterns that detract from the viewing experience.

Some Advantages of these Methods:

Traditional 3D movie projection requires that each viewer wear special glasses that separate the left and right eye images. The glasses reduce the image brightness. This new method of 3D simulation actually produces a large number of viewing image angles. This system uses a mirror-like screen (or essentially transparent refractive screen) so the image is far brighter than with traditional methods. This results in potential energy savings for the projection system, and/or allows far smaller pixels to be used, improving spatial resolution while maintaining high image brightness. This suggests that the screens will often be custom-generated for a particular venue—the location of the screen and the seats will be modeled and the shape of the reflective or refractive elements will be adjusted to point the pixels to the optimum locations, thus optimizing the experience for the viewers. It is not necessary that the various viewing angles be "evenly spaced" along the horizontal and vertical axes. In many cases, the best viewing experience will dictate that the viewing angles be distributed to fill the "viewing cone" that the audience occupies. In a movie theater, for example, the viewing angles should be distributed to cover the area of the seats, not the walls nor ceiling.

The invention can be implemented in several embodiments. One embodiment has a front projection screen with small protrusions pointing out towards the viewer or small indentations pointing away from the viewer, the protrusions and indentations having an egg carton bottom-like configuration. The screen is highly reflective, generally a mirror-like finish. An alternative embodiment uses a rear projection screen using the same egg carton bottom-like configuration, but employing a translucent lens array molded from a high-quality plastic or glass. The image is projected from behind and each pixel is refracted to the correct angle to the eye of the viewer. An auto-alignment system is employed with both embodiments, and can include either a camera which monitors the image from one or more angles, and provides feedback to the rendering system to adjust which pixels correspond to which "audience viewing angle," thereby reducing the need for precision alignment and calibration, or the inclusion of infrared or other invisible light into the projection system which allows constant real-time adjustment of projector and screen alignment.

A three-dimensional camera system functions like the viewing screen in reverse. For photographing large objects or scenes, multiple cameras positioned at different angles from the object or screen are preferred. However, for small objects or scenes, a single camera fitted with a refractive or transmissive lens array, which can capture the image, object or scene from a large number of viewing angles simultaneously, can be used, thereby enabling the reconstruction of a full three-dimensional model of the scene with far better spatial resolution than current state-of-the-art systems, which use several individual cameras which generate artifacts at object boundaries. The present system reduces the generation of such artifacts.

Light detection and ranging (LIDAR) systems can measure distance very precisely by measuring the time-of-flight of a light source reflected off a distant object, but such a measurement is limited to a single point-of-view. Reconstruction of a 3D scene will leave "blind spots" behind objects where the LIDAR scanner cannot see. In order to reduce or, potentially, eliminate blind spots in the 3D reconstruction of a scene, the LIDAR imager can be implemented so that it "sees" through the lens array. Thus enabled, the LIDAR scanner can see "around and behind" objects within their field of view.

PREFERRED EMBODIMENT OF THE INVENTION

The present invention provides a novel way of simulating three-dimensional images on a display screen without the need for a viewer to wear image-splitting glasses. Although it incorporates elements of both lenticular printing and holography, it is likely best characterized as a super set of lenticular printing. The invention can be used to portray both individual three-dimensional photographs or three-dimensional movies. Given that the manufacturing methods for monitors, projectors, DLP® imaging systems, and other displays is likely to continue to produce improved resolutions with time, it will become practical to use lensing systems to reflect or refract small collections of pixels at various angles to produce 3D "holographic" screens and display systems. The effective image resolution is reduced from the native screen resolution, but to the extent that the native resolutions are unnecessarily high for human viewing, spatial (angular) resolution can be improved or "traded off against" effective image resolution (For example, a 4×4 cluster of 16 pixels, spread out to 16 different angles, allows a viewer to see 16 different perspectives on an image, with a reduction in image resolution of a factor of 16. Each of these clusters will be called a volumetric pixel, or "voxel". In this case, a 16 megapixel imaging device, whether a camera or a projector, could produce a 1 megavoxel image having 16 distinct viewing perspectives. Three dimensional realism increases as the number of pixels in a voxel increases.

Image compression technology generally relies upon similarities between nearby pixels and spatial frequency-domain reconstruction of patterns and shading. Sending these various holographic images split into multiple angles will not necessarily result in good compression, as a single voxel will have different colors and brightness, depending on the viewing angle. When all the viewing angles are shown on a standard screen, the image would appeared very blurred or scrambled, and standard compression techniques will likely break down. At least two methods are anticipated to help overcome these issues. First, each viewing angle can be compressed as a separate video stream, preserving the efficiencies of modern image compression methods (H.263 and H.264, for example), and allowing the use of existing codecs, but at the expense of sending redundant information (because despite the differences in the angles, there is still much common information among them). A first implementation may use this method. A more advanced concept is to extend the algorithm for video compression, which reduces redundant information by reducing or eliminating both two-dimensional spatial redundancy and temporal redundancy, thereby improving storage efficiency by sending a portion of an image only once, with multiple copies created both in space and time, rather than re-transmitting the image segment for each frame and each location in the frame. The method extends image compression to exploit the three-dimensional spatial redundancy, essentially storing the "difference" between one viewing angle and each other viewing angle as a more heavily compressed sub-stream, but still allowing a high-quality image to be reconstructed for every viewing angle.

The invention will now be described in detail with reference to the attached drawing figures.

Figure 1:
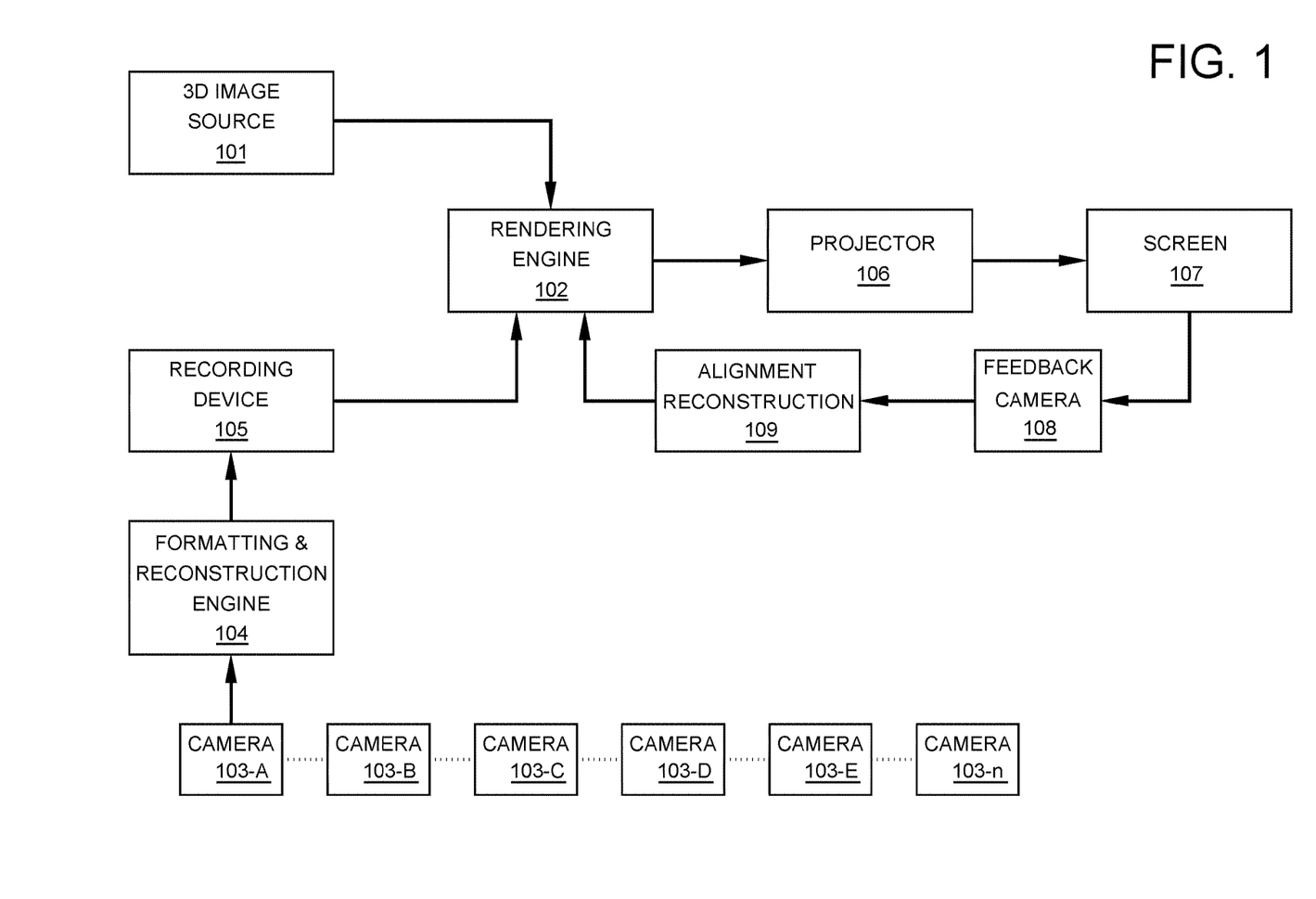
FIG. 1 is a block diagram of the three-dimensional projection screen system.

Referring now to FIG. 1, a three-dimensional image of an object or scene is provided by either a three-dimensional image source 101 or by an array of cameras (103-A through 103-n) that are preferably positioned at different locations on a spherical surface so that the distance from the object or scene remains relatively constant. Each of the cameras provides a different two-dimensional image of the object or scene. The photographic shoot may be compared to the experience of an audience at a live play. Each member of the audience sees the same live play, but no two members of the audience see precisely the same images. Each sees it from his own perspective. The more cameras in the array, the more realistic the creation of the three-dimensional composite image. The number of cameras can be reduced by generating images between adjacent cameras using an interpolative process. Given that human beings normally view the world with binocular vision seen from a horizontal plane, implementation of the invention can be greatly simplified by ignoring views both above and below the horizontal plane and having the cameras equiangularly-spaced on an arc rather scattered over a spherical surface. This means that all perspectives of each single composite photograph are taken on a single arc positioned in a horizontal plane. The arc ensures that each view is approximately equidistant from the object or scene being viewed. If three-dimensional realism is to be created for an audience, the absolutely minimum number of different perspective views that must be taken can be approximately calculated by positioning the arc so that it passes through the audience member farthest from the screen and dividing the arc into segments equal in distance to about half the minimum width between a viewers eyes. The average distance between the eyes of an adult is approximately 5 cm. This means that for members of the audience close to the screen, they will not see adjacent views. In other words, many views will be wasted for all but the viewers on the last row of the audience.

Although the three-dimensional imaging system of the present invention does not require the use of eye-tracking or head-tracking technologies to operate, the integration of eye-tracking into the system would allow improvements in the appearance and realism of the image by making small adjustments to the viewer's viewing angles when the position of the viewer's head is not optimized such that both eyes of the viewer see the same pixel of each voxel. The same technique would allow some unviewed perspectives (for example, the angles of light that would reach the ceiling of a movie theater, and would never be seen by a viewer) to be excluded by the image rendering engine, conserving processing power or allowing higher frame rates to be generated for the "important" viewing angles.

Still referring to FIG. 1, the three-dimensional image or images are sent to a rendering engine 102 that generates one or multiple consecutive screen displays. The screen displays are sent to a projector 106 which projects them onto a screen for viewing. Because the alignment of the image on the reflective screen elements must be extremely precise, at least one feedback camera 108 is employed to monitor alignment of the projected image with the reflective screen elements. Output from the feedback camera 108 is sent to an alignment reconstruction module 109, which interacts with the rendering engine 102 to reconfigure the projected image so that it aligns with the reflective elements of the screen.

Figures 2, 3:
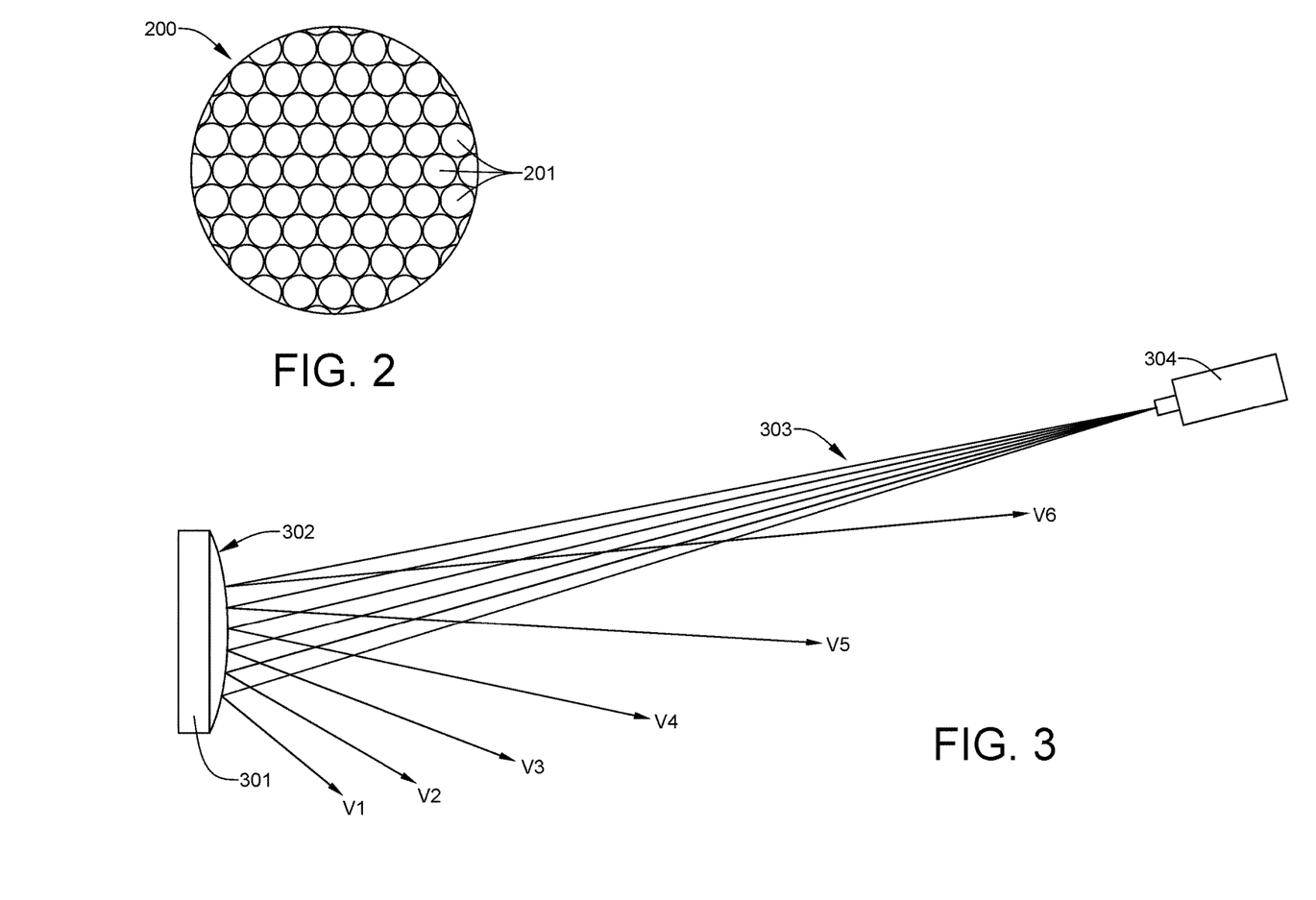
FIG. 2 is a front elevational view of a circular portion of a pattern for a reflective screen having a generic viewing cone provided by an array of circular reflectors.
FIG. 3 is an enlarged side elevational view of a single voxel-size reflector of the reflective screen pattern of FIG. 2, a convex-shaped reflectors, and on which are impinging a plurality of light rays from a projector.

Referring now to FIG. 2, this is a front view of a very small portion 200 of a screen showing a pattern of 55 complete circular-shaped voxels 201. Each voxel 201 can be either concave or convex. For concave voxels, the image must be transmitted by the projector upside down, as the focal point of each voxel is in front of the screen. For convex voxels, on the other hand, the focal point of individual voxels is behind the screen, so a right-side-up image is required.

Referring now to FIG. 3, an enlarged single convex voxel 301, having a circular perimeter and a highly reflective surface 302, receives incident light rays 303 from a projector 304. The light rays 303 are reflected from the reflective convex surface 302 toward the viewers V1 through V6. It will be noted that because we are dealing with a spherical reflecting surface, this single convex voxel provides a three-dimensional viewing cone. If a viewer were to turn his head so that his eyes were vertically oriented, he would still perceive the three-dimensional effect. It must be kept in mind that we are dealing with a single voxel, which for a viewer is equivalent of a single pixel in the display. Other viewers in the audience will see different pixels from the same voxel. Although, for the sake of simplicity, the projector is shown emitting pixel light rays that reflect off only this single voxel, in reality, the projector is shining light on an entire screen, which is a framed composite image array likely made up of millions of voxels.

Figure 4:
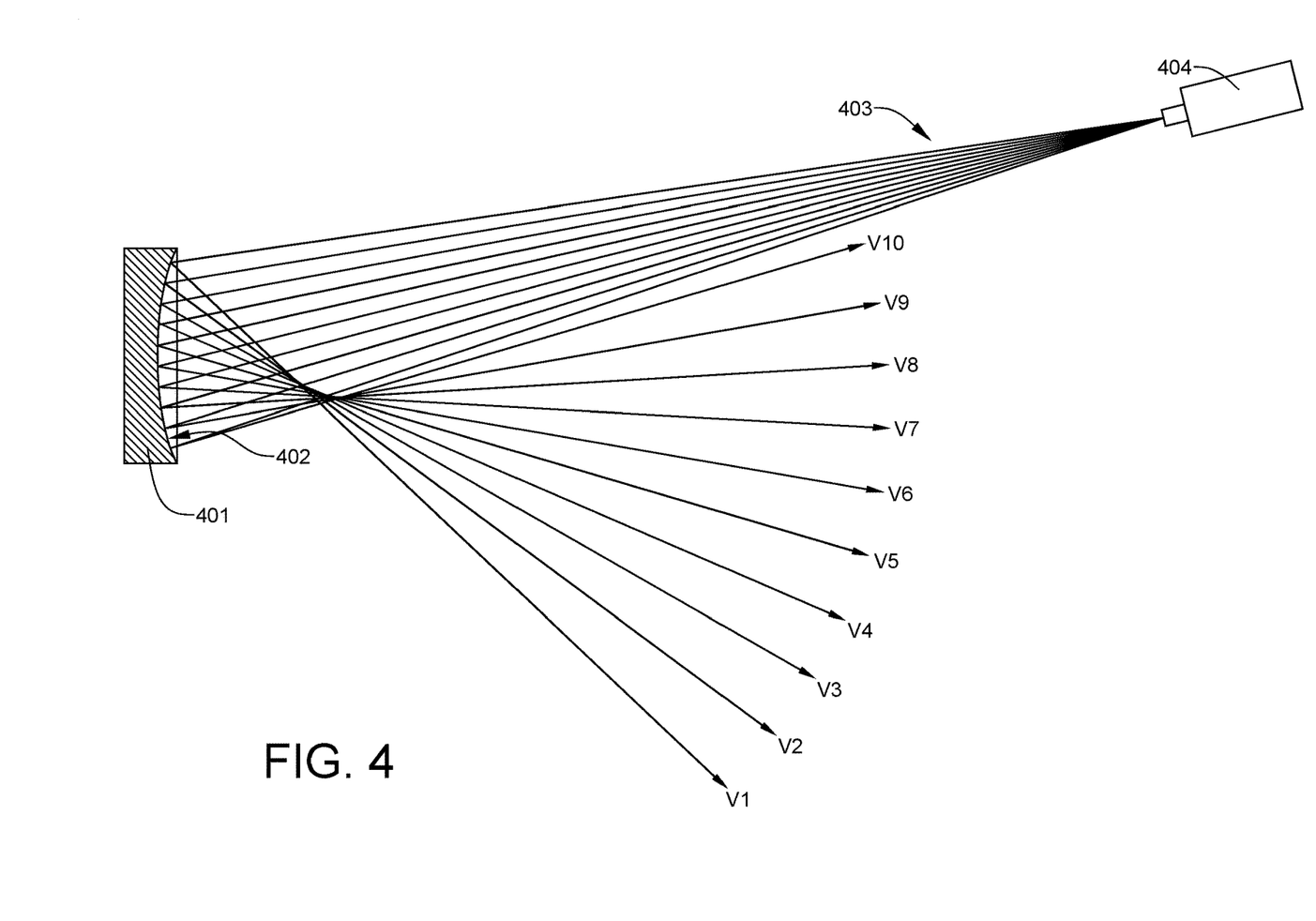
FIG. 4 is an enlarged side elevational view of a single voxel-size reflector of the reflective screen pattern of FIG. 2, configured with an array of concave-shaped reflectors, and on which is impinging a plurality of light rays from a projector.

Referring now to FIG. 4, an enlarged single concave voxel 401, having a circular perimeter and a highly reflective surface 402, receives incident light rays 403 from a projector 404. The light rays 403 are reflected from the reflective concave surface 402 toward the viewers V1 through V10. It will be noted that because we are dealing with a spherical reflecting surface, this single concave voxel also provides a three-dimensional viewing cone. It will be noted that the concave surface inverts the position of all pixels contained in the voxel because the focal point is in front of the reflective surface. Again, if a viewer were to turn his head so that his eyes were vertically oriented, he would still perceive the three-dimensional effect. It must be kept in mind that we are dealing with a single voxel, which for a viewer is equivalent of a single pixel in the display. As with the configuration of FIG. 3, other viewers in the audience will see different pixels from the same voxel. Although, for the sake of simplicity, the projector is shown emitting light rays that reflect off only this single voxel, in reality, the projector is shining light on an entire screen likely made up of millions of voxels.

Figures 5, 6, 7:
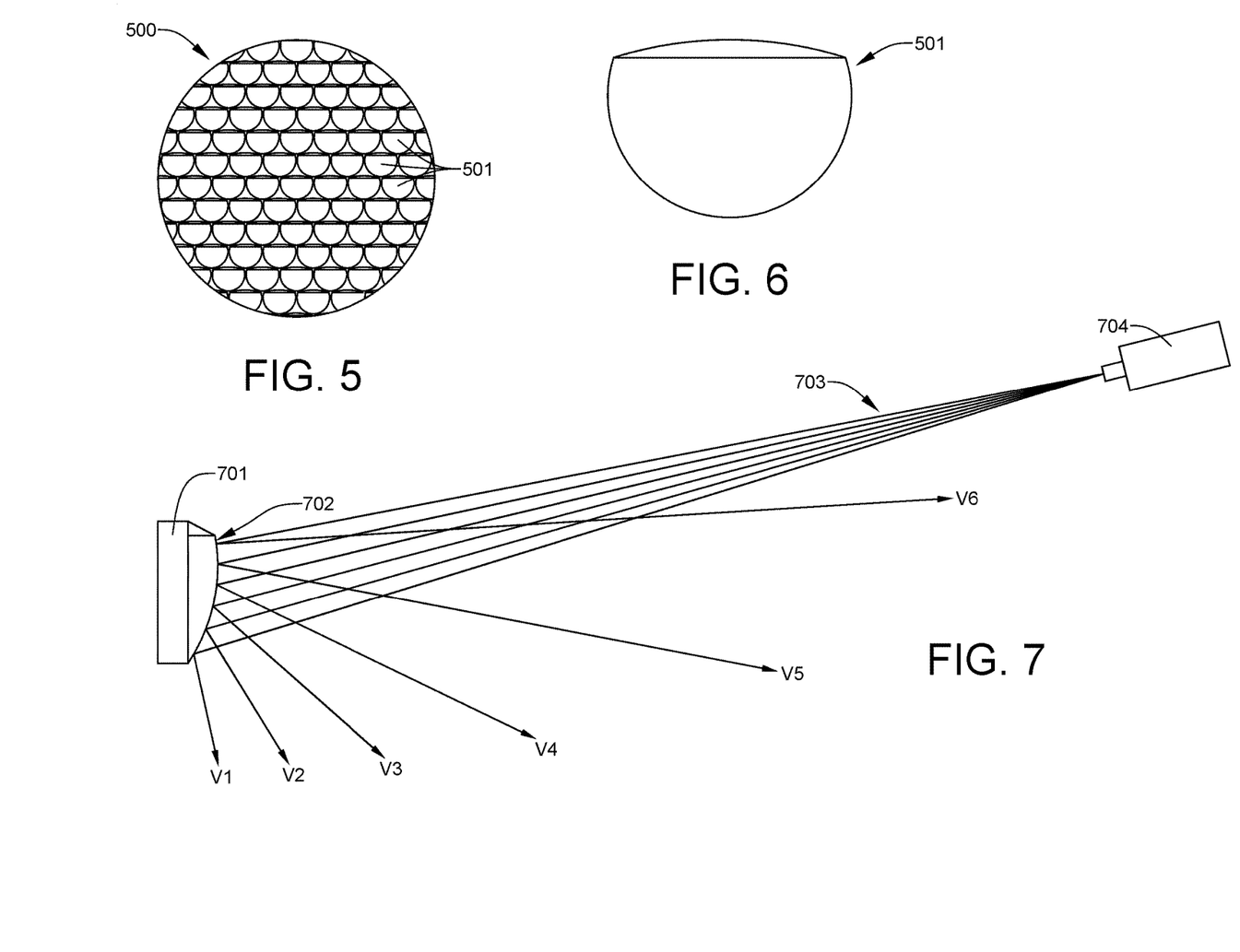
FIG. 5 is a front elevational view of a circular portion of a pattern for a reflective screen having a viewing cone optimized for a theater environment provided by an array of semi-circular reflectors.
FIG. 6 is an enlarged side front elevational view of a single semi-circular pattern element for the reflector of screen of FIG. 5.
FIG. 7 is an enlarged side elevational view of a single voxel-size reflector of the reflective screen pattern of FIG. 5, configured with an array of convex-shaped reflectors, and on which are impinging a plurality of light rays from a projector.

Referring now to FIG. 5, this is a front view of a very small portion 500 of a screen showing a pattern of 66 complete semi-circular-shaped voxels 501. Each voxel 501 can be either concave or convex. For concave voxels, the image must be transmitted by the projector upside down, as the focal point of each voxel is in front of the screen. For convex voxels, on the other hand, the focal point of individual voxels is behind the screen, so a right sight up image is required. The primary difference between voxels of FIG. 2 and those of FIG. 5 is that an upper portion of each circular voxel 201 has been eliminated, resulting in greater voxel density and a viewing cone that has been truncated to eliminate reflected rays that would be sent toward the ceiling of a theater.

Referring now to FIG. 6, an enlarged single semi-circular voxel 501, which may be configured with either a convex or a concave reflective surface, is shown.

Referring now to FIG. 7, an enlarged single convex voxel 700, having a highly reflective surface 702 and the semicircular shape of the voxels of FIGS. 5 and 6, receives incident light rays 703 from a projector 704. The light rays 703 are reflected from the reflective convex surface 702 toward the viewers V1 through V6. It will be noted that because we are dealing with a spherical reflecting surface, this single convex voxel provides a three-dimensional viewing cone. If a viewer were to turn his head so that his eyes were vertically oriented, he would still perceive the three-dimensional effect. It must be kept in mind that we are dealing with a single voxel, which for a viewer is equivalent of a single pixel in the display. Other viewers in the audience will see different pixels from the same voxel. Although, for the sake of simplicity, the projector is shown emitting light rays that reflect off only this single voxel, in reality, the projector is shining light on an entire screen likely made up of millions of voxels.

Figures 8, 9, 10:
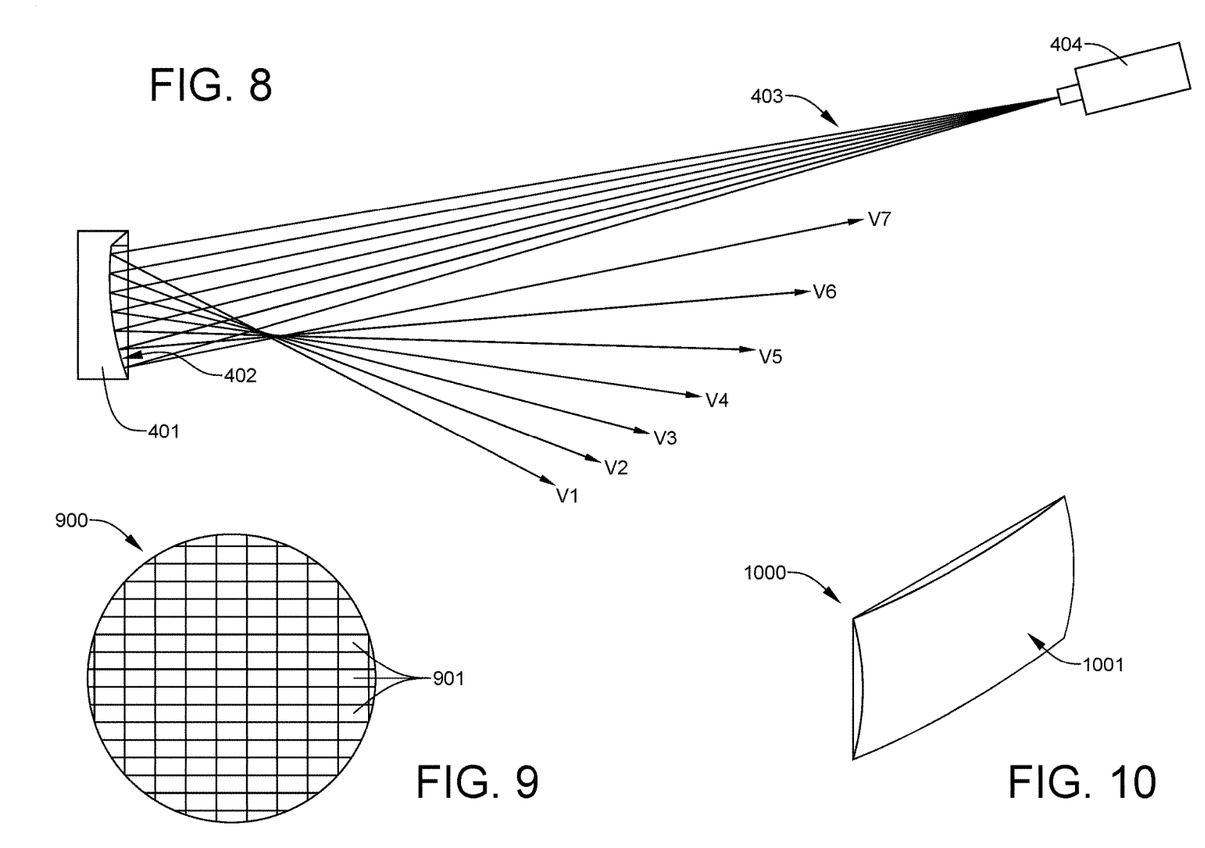
FIG. 8 is an enlarged side elevational view of a single voxel-size reflector of the reflective screen pattern of FIG. 5, configured with an array of concave-shaped reflectors, and on which are impinging a plurality of light rays from a projector.
FIG. 9 is a front elevational view of a circular portion of a pattern for a reflective screen having a broad viewing wedge optimized for a theater environment provided by an array of rectangular cylindrical reflectors.
FIG. 10 is an enlarged isometric view of a single rectangular cylindrical reflector for use with the screen pattern of FIG. 9.

Referring now to FIG. 8, an enlarged single concave voxel 801, having a semi-circular perimeter and a highly reflective surface 802, receives incident light rays 803 from a projector 804. The light rays 803 are reflected from the reflective concave surface 802 toward the viewers V1 through V7. It will be noted that because we are dealing with a spherical reflecting surface, this single concave voxel also provides a three-dimensional viewing cone. It will be noted that the concave surface inverts the position of all pixels contained in the voxel because the focal point is in front of the reflective surface. Again, if a viewer were to turn his head so that his eyes were vertically oriented, he would still perceive the three-dimensional effect. It must be kept in mind that we are dealing with a single voxel, which for a viewer is equivalent of a single pixel in the display. As with the configuration of FIG. 7, other viewers in the audience will see different pixels from the same voxel. Although, for the sake of simplicity, the projector is shown emitting light rays that reflect off only this single voxel, in reality, the projector is shining light on an entire screen likely made up of millions of voxels.

Referring now to FIG. 9, this is a front view of a very small portion 900 of a screen showing a pattern of 103 complete rectangular, semi-sperical voxels 901. Although each voxel 901 can be either an inner or outer portion of a sphere, only the outer portion will be discussed in detail. It should be apparent that if an inner portion of a sphere were used as the reflective surface, the image sent to the voxel would need to be inverted so that a normal image would be seen by viewers.

Referring now to FIG. 10, an enlarged view of a single rectangular outer convex voxel 1000 having a highly reflective surface 1001 is shown. It should be understood that this voxel 1000 is only one of potentially millions of identical voxels in a screen array. A screen array of voxels such as this will receive a single horizontal line of pixel data replicated in multiple lines from the top to the bottom of the voxel. Thus, the three-dimensional effect will be seen only with viewers' eyes focused in a horizontal plane. The right-to-left curvature of the voxel distributes unique pixels to an eye of each viewer (audience member), while the top-to-bottom curvature ensures that all viewers, regardless of their elevation in the theater, will have access to pixels from each voxel.

Figure 11:
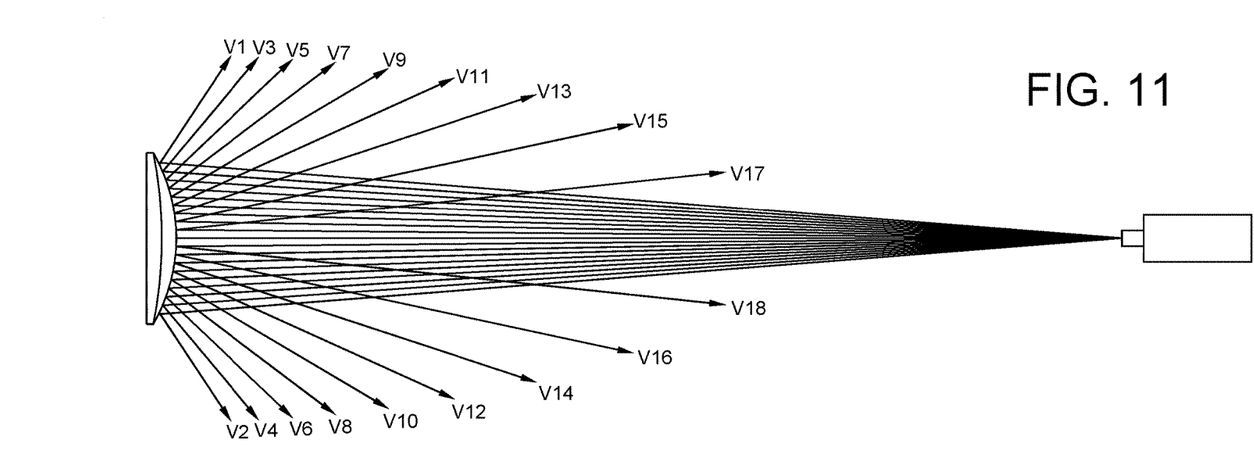
FIG. 11 is an enlarged top plan view a single rectangular voxel-size reflector of the reflective screen pattern of FIG. 8, having both a spherical component and a cylindrical component, and on which are impinging a plurality identical horizontal lines of RGB pixels from a projector.
Figure 12:
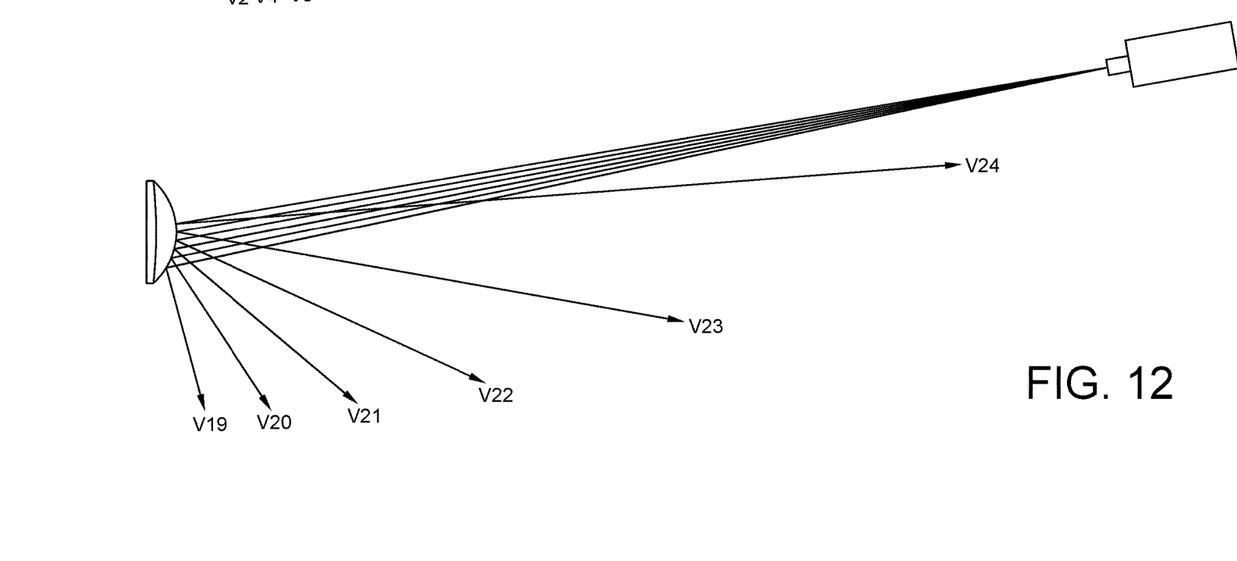
FIG. 12 is an enlarged side elevational view of the single rectangular voxel-size reflector of FIG. 11, on which are impinging a plurality identical horizontal lines of RGB pixels from a projector.

Referring now to FIGS. 11 and 12, an enlarged single convex voxel 1101, having a rectangular perimeter 1102 and a highly reflective surface 1103, receives incident light rays 1104 from a projector 1105. The light rays 1104 are reflected from the reflective convex surface 1103 toward the viewers V1 through V18. Ideally, the reflective surface will have two cylindrical components, each preferably having a different focal length. voxels such as this will receive a single horizontal line of pixel data replicated in multiple lines from the top to the bottom of the voxel. As described above, the three-dimensional effect will be seen only with viewers' eyes focused in a horizontal plane. The right-to-left curvature of the voxel about a vertical or semi-vertical reflects and distributes unique pixels to an eye of each viewer (audience member), while the top-to-bottom curvature about a horizontal axis ensures that all viewers, regardless of their elevation in the theater, will have access to pixels from each voxel. FIG. 11 represents the reflection and distribution of unique pixels to the eyes of viewers V1 through V18. FIG. 12, on the other hand, represents the reflection of the single horizontal pixel line to viewers V19 through V24 who are positioned at different elevational angles.

As heretofore explained, screens—whether reflective or transmissive—have an array of receptors, with each receptor acting as in impingement target for the pixel light rays of a single voxel transmitted by the projector. Each receptor causes the pixel light rays, which impinge thereon, to selectively change course en route to a viewer, so that each eye of the viewer sees a different pixel light ray of each voxel, which the viewer's brain interprets as being components of a three-dimensional image. Though the screen itself is composed of an array of receptors, the overall screen shape may be flat or curved, in order to better optimize the effect for the viewers. Both convex and concave geometries can be used. In a theater, a curved, or concave, screen may be the preferred configuration. However, for a display that people walk around (such as at a trade show, amusement park, or museum) a convex screen may provide a better viewing experience. Screens have more complex geometries may also serve to convince viewers that the 3D illusion is real. For example, a screen shaped roughly like a face, mounted on a lifelike android, could provide a remarkably lifelike viewing experience. Similar techniques using two-dimensional screens have been employed at Disney theme parks.

Figure 13:
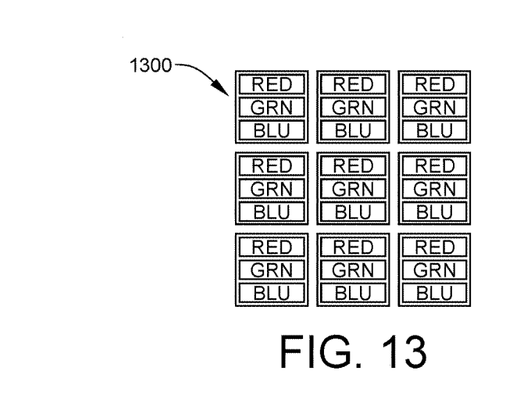
FIG. 13 is a voxel configured with a first conventional arrangement of red, green and blue pixel components, arranged as adjacent red, green and blue rectangles.
Figure 14:
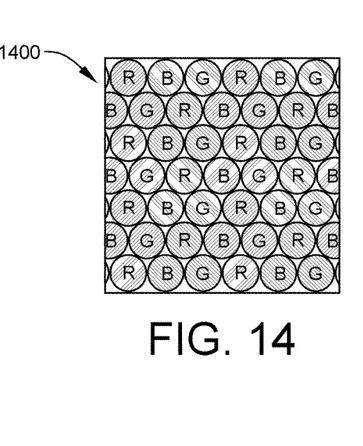
FIG. 14 is a voxel configured with a second conventional arrangement of red, green and blue pixel components, arranged as adjacent red, green and blue dots.
Figure 15:
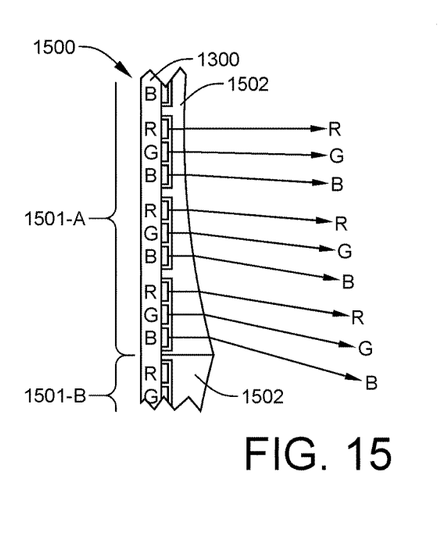
FIG. 15 is an enlarged side elevational view a portion of each of two single refractive voxels, showing how conventional spacing of red, green and blue pixel components is likely to create an undesirable, color-banded moiré pattern of the image.

FIGS. 13, 14 and 15 and intended to demonstrate that conventional arrange or red, green and blue pixel components are not ideal for implementing the present invention, and will result in images having color-banded moiré patterns.

Referring now to FIG. 13, a nine-pixel LED projector portion 1300 of a voxel is configured with a first conventional arrangement of red, green and blue pixel components, arranged as adjacent red (RED), green (GRN) and blue (BLU) rectangles.

Referring now to FIG. 14, an LED projection portion 1400 of a voxel is configured with a second conventional arrangement of red, green and blue pixel components, arranged as red, green and blue dots.

Referring now to FIG. 15, the LED projector portion 1300 of FIG. 13 is incorporated in a display 1500 having voxels 1501 with a concave refracting lenses 1502. Portions of only two voxels 1501-A and 1501-B are shown. This drawing figure clearly shows that red, green and blue light rays produced by a single pixel of the LED projector portion 1300 are never convergent. In fact, the concave refracting lens 1502 tends to augment the separation of RGB pixel components. As a viewer would see only one component of each RGB unit, an undesirable, color-banded moiré pattern will likely be seen by a viewer.

Figure 16:
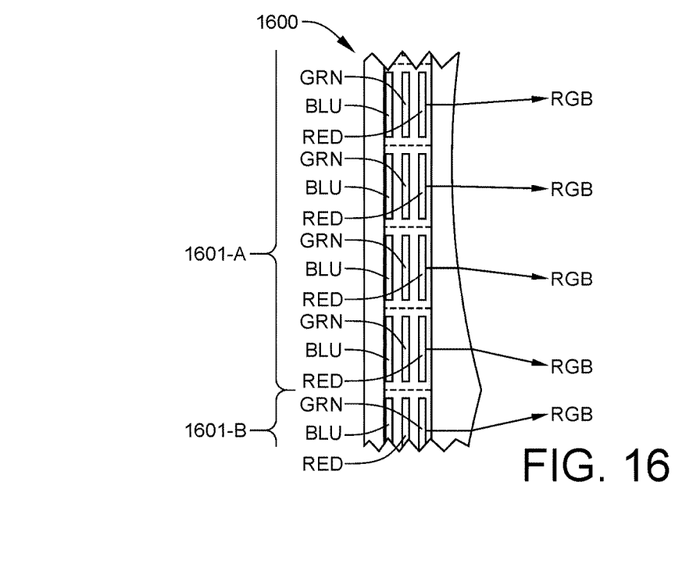
FIG. 16 is an enlarged side elevational view of a voxel which employs an array of superimposed, stacked red, green and blue LED elements to eliminate the color-banded moiré pattern effect.

Referring now to FIG. 16, portions of two voxels 1601-A and 1601-B are shown of a new LED projector and concave lens assembly 1600 which has superimposed red, green and blue pixel segments (each of which is identified as RED, GRN or BLU). This arrangement provides light beams emanating from the assembly that are very close to convergent. Concave refractive lenses 1602-A and 1602-B are attached directly to the voxels 1601-A and 1601-B, respectively. Refraction does admittedly cause some slight divergence of the red, green and blue light beams, as blue light is refracted slightly more than green light, which is refracted slightly more than red light. This divergence problem can be ameliorated by offsetting the placement of red, green and blue pixel elements, depending on their position beneath the lens. For example, those pixel elements beneath the center of a voxel associated lens need not be offset at all, as no refraction occurs. On the other hand, pixel elements near the edge of the lens would need to be offset from one another the most to compensate for divergence. The stacking of red, green and blue pixel elements in this LED projector goes a long way to eliminate color banding and moiré patterns that would be perceived by viewers in an audience. The offsetting of red, green and blue pixel elements depending on their location beneath the lens can further reduce the problem.

Figure 17:
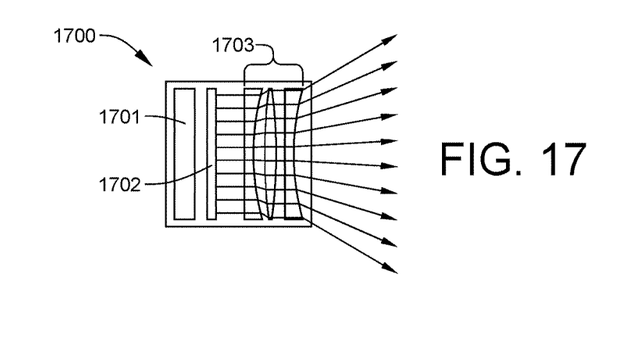
FIG. 17 is a side elevational view of a refractive voxel which employs an array of superimposed, stacked red, green and blue LED elements.

Referring now to FIG. 17, a single voxel unit 1600 is shown which uses the new LED projector of the type shown in FIG. 16. The voxel unit 1700 has an electronic module 1701, a pixel array 1702 in which red, green and blue elements of each pixel are stacked one above the other, and a refractive lens assembly 1703.

For high-color-gamut presentation, additional colors beyond the primary standard of red, green and blue may be employed by the imaging system, thereby making the images more realistic, in similar fashion to the use of 6 colors in some high-end ink-jet printers for photographic printing. The additional colors expand the range of colors (the gamut), making the images more realistic.

Figures 18, 19:
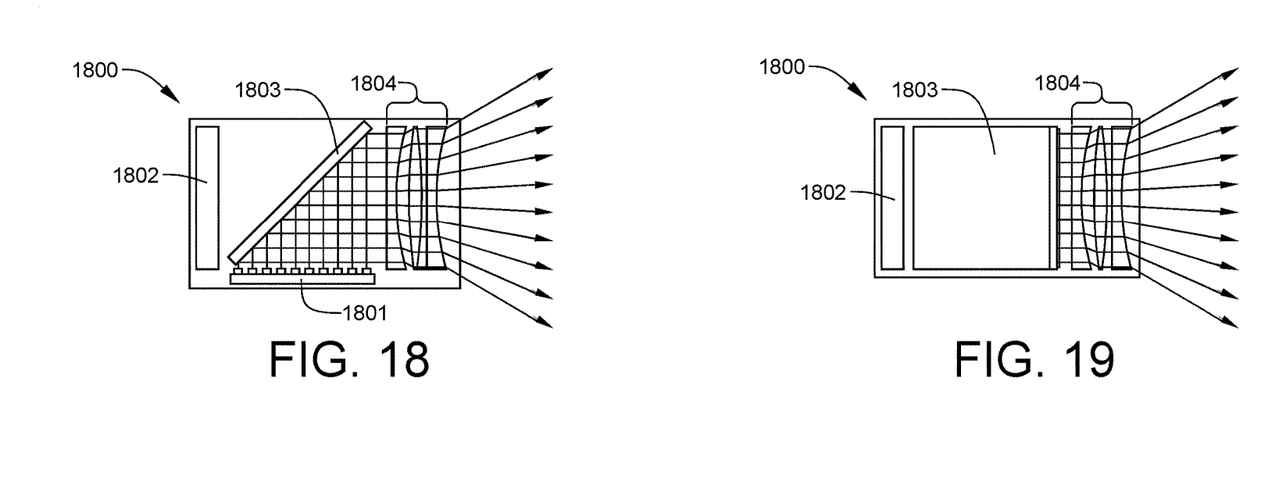
FIG. 18 is an enlarged side elevational view of a refractive voxel employing cylindrical lenses and digital light processing (DLP) technology.
FIG. 19 is a top plan view of the enlarged refractive voxel of FIG. 17.

Referring now to FIG. 18 is a side view of a digital light processing refractive voxel 1800 shows a plurality of tricolor LEDs 1801, an electronic circuitry module 1802, an array of DLP bistable mirrors 1803 controlled by the electronic circuitry module 1802, and a spherical lens assembly 1804.

Referring now to FIG. 19, the digital light processing, cylindrical lens, refractive voxel 1800 of FIG. 18 is shown in a top plan view.

Figure 20:
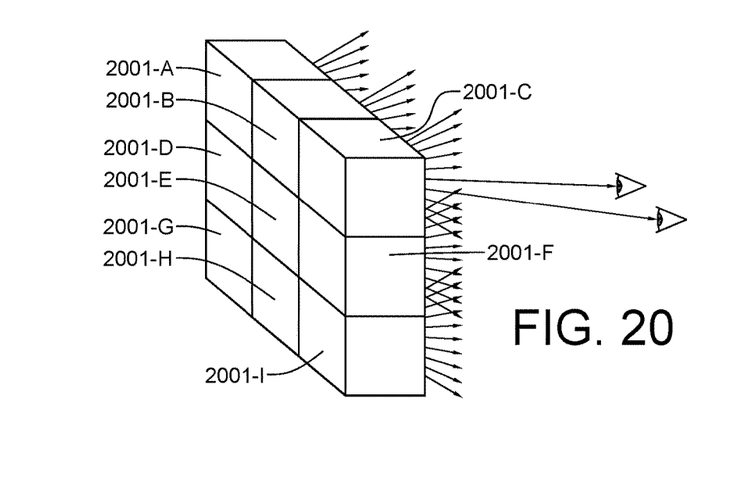
FIG. 20 is an enlarged isometric view of a group of arrayed, refractive voxels.

Referring now to FIG. 20, an array of voxels 2001-A, 2001-B, 2001-C, 2001-D, 2001-E, 2001-F, 2001-G, 2001-H and 2001-I, each having a spherical lens provides true three dimensional viewing about both vertical and horizontal axes. Each of a viewer's two eyes would see a single pixel from each voxel. However, no two viewers would see the same set of pixels emanating from all voxels. The set of pixels visible by a viewer depends on his location with respect to the viewing screen.

Ambient light sources, when they fall on the display screen, might spoil the effect for the viewer. In order to improve this effect, light sensors on/around/near the screen may be used to provide feedback to the image engine to adjust the appearance of the image to compensate for the ambient light. Alternatively, a camera located near the projection apparatus, feeding an image of the screen, as it appears to a viewer, including ambient light effects, may feed the real-time feedback image to the image engine to allow for the same type of compensation.

Although only several embodiments of a single embodiment of the three-dimensional holographic projection screen have been shown and described, it will be obvious to those having ordinary skill in the art that changes and modifications may be made thereto without departing from the scope and the spirit of the invention as hereinafter claimed.

What is claimed is:

1. A three-dimensional imaging system comprising:
a projector which transmits an array of voxels, each voxel comprising a plurality of spaced-apart pixel light rays, with each pixel light ray within a particular voxel representing a single pixel of an image from a unique viewing angle; and
a screen having an array of receptors, each receptor acting as in impingement target for the pixel light rays of a single voxel transmitted by the projector, each receptor causing the pixel light rays, which impinge thereon, to selectively change course en route to a viewer, so that each eye of the viewer sees a different pixel light ray of each voxel, which the viewer's brain interprets as being components of a three-dimensional image.

2. The three-dimensional imaging system of claim 1, wherein the screen is positioned between the viewer and the projector so as to create a rear-projection system, and each receptor is a lens that causes the pixel light rays incident thereon to diverge as they approach the eyes of the viewer.

3. The three-dimensional imaging system of claim 2, wherein each lens has a convex shape.

4. The three-dimensional imaging system of claim 2, wherein each lens has a concave shape that causes the pixel light rays incident thereon to, first, converge before they diverge as they approach the eyes of the viewer.

5. The three-dimensional imaging system of claim 2, wherein the projector and the screen are incorporated in a single panel, and each pixel light ray is generated as a combination of coincident red, green and blue dots.

6. The three-dimensional imaging system of claim 1, wherein the projection is positioned in front of the screen so as to create a front-projection system, and each receptor is a mirror that causes the pixel light rays incident thereon to reflect and diverge as they approach the eyes of the viewer.

7. The three-dimensional imaging system of claim 6, wherein each mirror has a convex shape.

8. The three-dimensional imaging system of claim 6, wherein each mirror has a concave shape that causes the pixel light rays incident thereon to, first, converge before they diverge as they approach the eyes of the viewer.

9. The three-dimensional imaging system of claim 1, wherein each image received by a single eye of a viewer includes at least one and no more than two pixel light rays from each voxel.

10. The three-dimensional imaging system of claim 8, wherein no two viewers who are watching the screen have identical viewing experiences.

11. The three-dimensional imaging system of claim 1, wherein a camera system used to generate raw images for subsequent viewing, functions like the viewing screen of the present invention in reverse, whereby large objects and scenes are photographed with multiple cameras positioned at different angles from the objects and scenes.

12. The three-dimensional imaging system of claim 1, wherein a camera system used to generate raw images for viewing functions like the viewing screen of the present invention in reverse, whereby for small objects or scenes, a single camera fitted with a lens array selected from the group consisting of refractive and transmissive lens captures the objects and scene from a large number of viewing angles simultaneously.

13. The three-dimensional imaging system of claim 12, which further comprises a light detection and ranging (LIDAR) system, which, in combination with the lens array, enables geometry data of the image to be generated which would otherwise be hidden from view of a single camera at a fixed location.

14. A three-dimensional video imaging system comprising:
a projector which transmits sequential arrays of voxels at a rate of at least 24 arrays per second, each voxel of a single array comprising a plurality of spaced-apart pixel light rays, with each pixel light ray within a particular voxel representing a single pixel of an image from a unique viewing angle; and
a screen having an array of receptors, each receptor acting as in impingement target for the pixel light rays of a single voxel transmitted by the projector, each receptor causing the pixel light rays, which impinge thereon, to selectively change course en route to a viewer, so that each eye of the viewer sees a different pixel light ray of each voxel, which the viewer's brain interprets as being components of a three-dimensional image.

15. The three-dimensional video imaging system of claim 14, which further comprises an auto-alignment system which employs at least one camera, which monitors the image from at least one angle, and provides feedback to a rendering system for calibration of pixel light rays so that viewers are provided with correct pixel light ray viewing angles, thereby enabling continuous real-time adjustment of projector and screen alignment.

16. A three-dimensional imaging system comprising:
a three-dimensional image rendering engine which generates a framed composite image array of a scene viewed from x number of angularly-spaced intersecting framed perspectives, each framed perspective of the scene containing y number of pixels, each framed perspective contributing a single pixel from each matching pixel location to the composite image array composed of y number of voxels, each voxel containing x number of pixels which represent the scene as seen from x number of viewing angles;
a projector which transmits all pixels in the framed composite image as a plurality of spaced-apart pixel light rays; and
a screen having an array of receptors, each receptor acting as in impingement target for the pixel light rays of a single voxel transmitted by the projector, each receptor causing the pixel light rays, which impinge thereon, to selectively change course en route to a viewer, so that each eye of the viewer sees a different pixel light ray of each voxel, which the viewer's brain interprets as being components of a three-dimensional image.

17. The three-dimensional imaging system of claim 16, which further comprises a data compression system, which analyzes image information stored as digital data, and compresses the data by removing redundant information.

18. The three-dimensional imaging system of claim 17, wherein the data compression system utilizes Fourier transform to remove redundant information from image data.

19. The three-dimensional imaging system of claim 16, which further comprises an interpolation system that interpolates image data generated by the rendering engine in order to provide additional framed perspectives between adjacent angularly-spaced framed perspectives that were generated by the rendering engine.

20. The three-dimensional imaging system of claim 16, which is configured as a video imaging system by transmitting a sequence of voxel arrays at a rate of at least 24 arrays per second.

* * * * *